(12) United States Patent
Le Creff et al.

(10) Patent No.: US 9,002,314 B2
(45) Date of Patent: Apr. 7, 2015

(54) METHOD THAT ENABLES THE USER OF A WIRELESS TELEPHONE TERMINAL TO ESTABLISH AN EMERGENCY CONNECTION IN A LOCAL NETWORK, AND TERMINAL AND SERVER FOR CARRYING OUT THIS METHOD

(75) Inventors: Michel Le Creff, Vigny (FR); Raymond Gass, Bolsenheim (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1788 days.

(21) Appl. No.: 11/578,721

(22) PCT Filed: Apr. 13, 2005

(86) PCT No.: PCT/FR2005/000890
§ 371 (c)(1),
(2), (4) Date: Dec. 14, 2006

(87) PCT Pub. No.: WO2005/109930
PCT Pub. Date: Nov. 17, 2005

(65) Prior Publication Data
US 2007/0254624 A1    Nov. 1, 2007

(30) Foreign Application Priority Data
Apr. 19, 2004  (FR) ...................... 04 04090

(51) Int. Cl.
| | | |
|---|---|---|
| *H04M 11/04* | (2006.01) |
| *H04L 29/06* | (2006.01) |
| *H04W 4/22* | (2009.01) |
| *H04W 12/08* | (2009.01) |
| *H04W 24/02* | (2009.01) |
| *H04W 76/00* | (2009.01) |
| *H04L 29/08* | (2006.01) |

(52) U.S. Cl.
CPC ............. *H04L 63/0807* (2013.01); *H04W 4/22* (2013.01); *H04W 12/08* (2013.01); *H04W 24/02* (2013.01); *H04W 76/007* (2013.01); *H04L 67/04* (2013.01)

(58) Field of Classification Search
USPC ........................... 455/521, 404.1; 379/45, 33
See application file for complete search history.

(56) References Cited

U.S. PATENT DOCUMENTS 6,070,065 A * 5/2000 Armbruster et al. ........ 455/404.2
6,112,075 A * 8/2000 Weiser ....................... 455/404.1

(Continued)

FOREIGN PATENT DOCUMENTS

| WO | WO 03/009627 A | 1/2003 |
| WO | WO 03/030445 A | 4/2003 |
| WO | WO 03/088547 A | 10/2003 |

*Primary Examiner* — Nimesh Patel
(74) *Attorney, Agent, or Firm* — Fay Sharpe LLP

(57) ABSTRACT

When establishing an emergency connection in a wireless network having an authentication server, wherein a user terminal is a non-subscriber to the network, a dialed number is recognized as an emergency number and the terminal sends a start-up message to a radio access point of the network. The terminal receives a first message that requests the identity of the terminal, from the access point in response to the start-up message, and sends a second message, which contains the identity of the terminal and an indication indicating that the terminal is attempting to make an emergency call. An authentication server determines that the second message contains an indication that the call is an emergency call, and sends an acceptance message to the terminal via the access point wherein a port of the access point is validated to permit the terminal to establish an emergency connection.

5 Claims, 3 Drawing Sheets

(56) References Cited

U.S. PATENT DOCUMENTS

| | | | | |
|---|---|---|---|---|
| 6,246,884 B1 * | 6/2001 | Karmi et al. | | 455/521 |
| 6,477,362 B1 * | 11/2002 | Raith et al. | | 455/404.1 |
| 6,574,484 B1 * | 6/2003 | Carley | | 455/521 |
| 7,567,166 B2 * | 7/2009 | Bourgine De Meder | | 340/432 |
| 2002/0133716 A1 * | 9/2002 | Harif | | 713/201 |
| 2002/0142753 A1 * | 10/2002 | Pecen et al. | | 455/411 |
| 2003/0119481 A1 | 6/2003 | Ahmavaara et al. | | |
| 2004/0073793 A1 | 4/2004 | Takeda | | |
| 2004/0176066 A1 * | 9/2004 | Binzel et al. | | 455/404.1 |
| 2005/0009521 A1 * | 1/2005 | Preece | | 455/435.1 |
| 2006/0088020 A1 * | 4/2006 | Gass | | 370/338 |

* cited by examiner

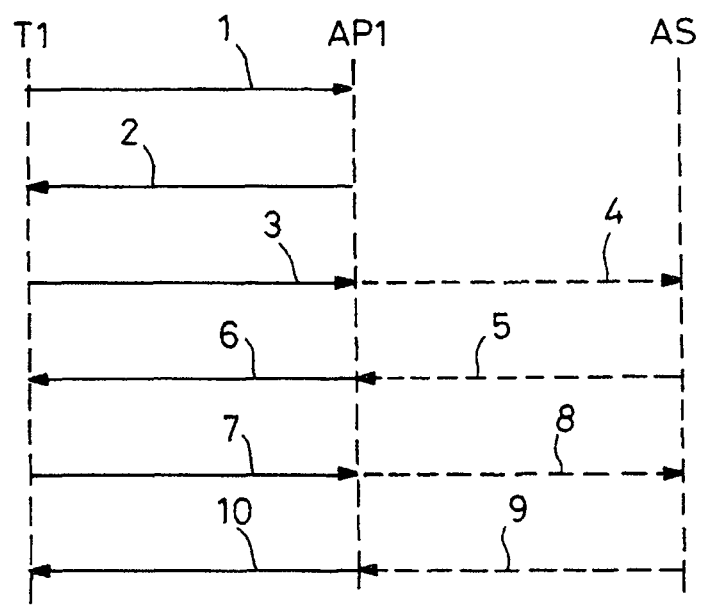
FIG_2

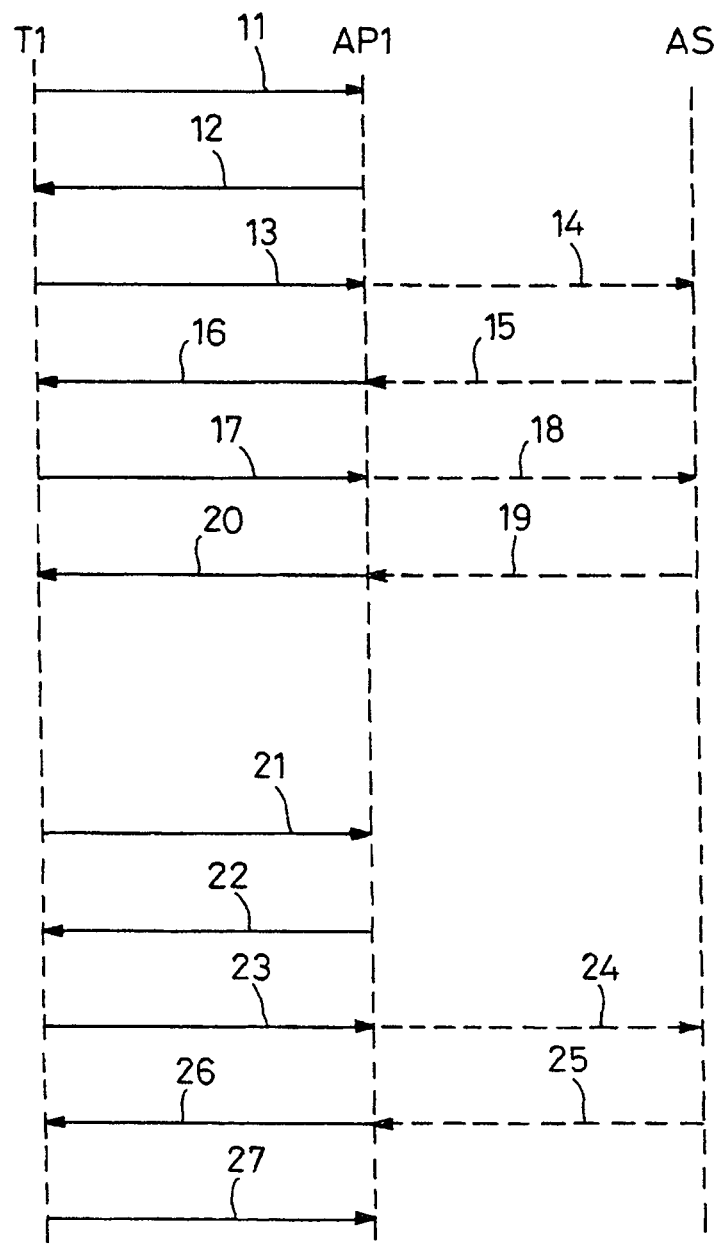
FIG_3

METHOD THAT ENABLES THE USER OF A WIRELESS TELEPHONE TERMINAL TO ESTABLISH AN EMERGENCY CONNECTION IN A LOCAL NETWORK, AND TERMINAL AND SERVER FOR CARRYING OUT THIS METHOD

The invention concerns a method that enables the user of a wireless telephone terminal, intended to be connected to a wireless local network of the IEEE 802.11 type, for example, to establish an emergency connection in a local network, to telephone a rescue center, even if that user has no right of access to the wireless local network that serves the area in which he is situated at the time he needs rescue.

In companies, it is more and more routine to use a wireless mobile telephone connecting, via an IEEE 802.11 type radio link, to a computer and telephone local network belonging to a company. Certain personal digital assistants and certain personal computers also offer this telephone function.

Access to a company local network is generally restricted to certain users who are employees of that company. When the user of this kind of terminal is on the premises of the company that employs him, he has a right of access to the local network, which enables him to telephone in any circumstances. On the other hand, the same user cannot telephone when he is on the premises of another company, because does not have a right of access in the local network of that other company. In particular, he cannot telephone a rescue centre with his usual terminal, unless the latter is a dual mode terminal, i.e. one also enabling access to a public mobile telephone network such as a GSM network.

A method known in public mobile telephone networks, especially GSM type networks, enables the user of a radiotelephone terminal to establish an emergency connection in that network to telephone a rescue centre, even if that user has no right of access to the network which covers the place in which he is situated and even if there is no SIM (Subscriber Identification Module) card in his terminal. This known method consists in authorizing a user to access a mobile service switching centre via a base station and a base station controller even before the terminal has had to satisfy the procedure for authenticating that user. The mobile service switching centre therefore receives the called number and can tell that it is an emergency number. In this case, it does not initiate the authentication procedure but sets up the requested connection.

This method cannot be transposed to an IEEE 802.11 type network because, in that type of network, all current methods of setting up a connection consist in prohibiting a priori the radio access points from setting up a connection between a terminal and the network before the authentication procedure is satisfied, except for a temporary connection with an authentication server, to be able to carry out the authentication procedure.

The object of the invention is to propose a method enabling the user of a wireless telephone terminal to establish an emergency connection in a wireless local network, to telephone a rescue centre, even if that user has no right of access to that local network and the method for establishing a connection in that network prohibits a priori the radio access points from establishing a connection between a terminal and the network before the authentication procedure is satisfied.

The invention consists in method enabling the user of a wireless telephone terminal to establish an emergency connection in a local network, including an authentication server even when this user does not have the right to access this local network, characterized in that it consists, when the user has entered an emergency telephone number, in:
  recognizing this number as an emergency number and then sending a start-up message from the terminal to a radio access point of the network;
  sending a message, which requests its identity of the terminal, from an access point to the terminal in response to the start-up message;
  then sending a message which contains the identity of the terminal and an indication signifying that it is an emergency call, from the terminal to the radio access point of the network;
  transmitting a message containing said identity information and an indication signifying that it is an emergency call from the access point to the authentication server;
  recognizing, in the authentication server, that this message contains an indication signifying that it is an emergency call, and then sending an acceptance message to the terminal via the access point, and;
  recognizing this acceptance message when in transit via the access point and then validating a port of the access point enabling the terminal to establish an emergency connection over the local network.

The invention also consists in a wireless telephone terminal enabling its user to establish an emergency connection in a wireless local network, characterized in that it includes means for:
  recognizing a number as an emergency number when the user has entered an emergency telephone number and then sending a start-up message from the terminal to a radio access point of the network;
  receiving from the access point of the network a response message requesting its identity of the terminal;
  then sending from the terminal to the access point a message containing the identity of the terminal and an indication signifying that this is an emergency call, this message being intended for an authentication server;
  receiving an acceptance message sent by the authentication server via this access point and intended to validate conventionally a port of an access point in order to enable the terminal to establish an emergency connection across the local network; and
  then sending to this access point a message requesting establishing of an emergency connection over the local network.

The invention further consists in an authentication server enabling the user of a wireless telephone terminal to set up an emergency connection in a local network, characterized in that it includes means for:
  receiving via a radio access point a message coming from a terminal and containing the identification of that terminal and an indication signifying that it is an emergency call;
  recognizing in this message the indication signifying that this is an emergency call and then sending to the terminal via this access point an acceptance message intended to validate conventionally a port of this access point in order to enable the terminal to establish an emergency connection across the local network.

The invention will be better understood and other features will become apparent in the light of the following description and the accompany figures:

FIG. 2 represents a timing diagram illustrating the known method according to the IEEE 802.11 and IEEE 802.1x standards for authenticating a terminal and then establishing a connection;

FIG. 3 represents a timing diagram illustrating the method according to the invention for authenticating a terminal and then establishing an emergency connection without authenticating the terminal.

Figure 1:
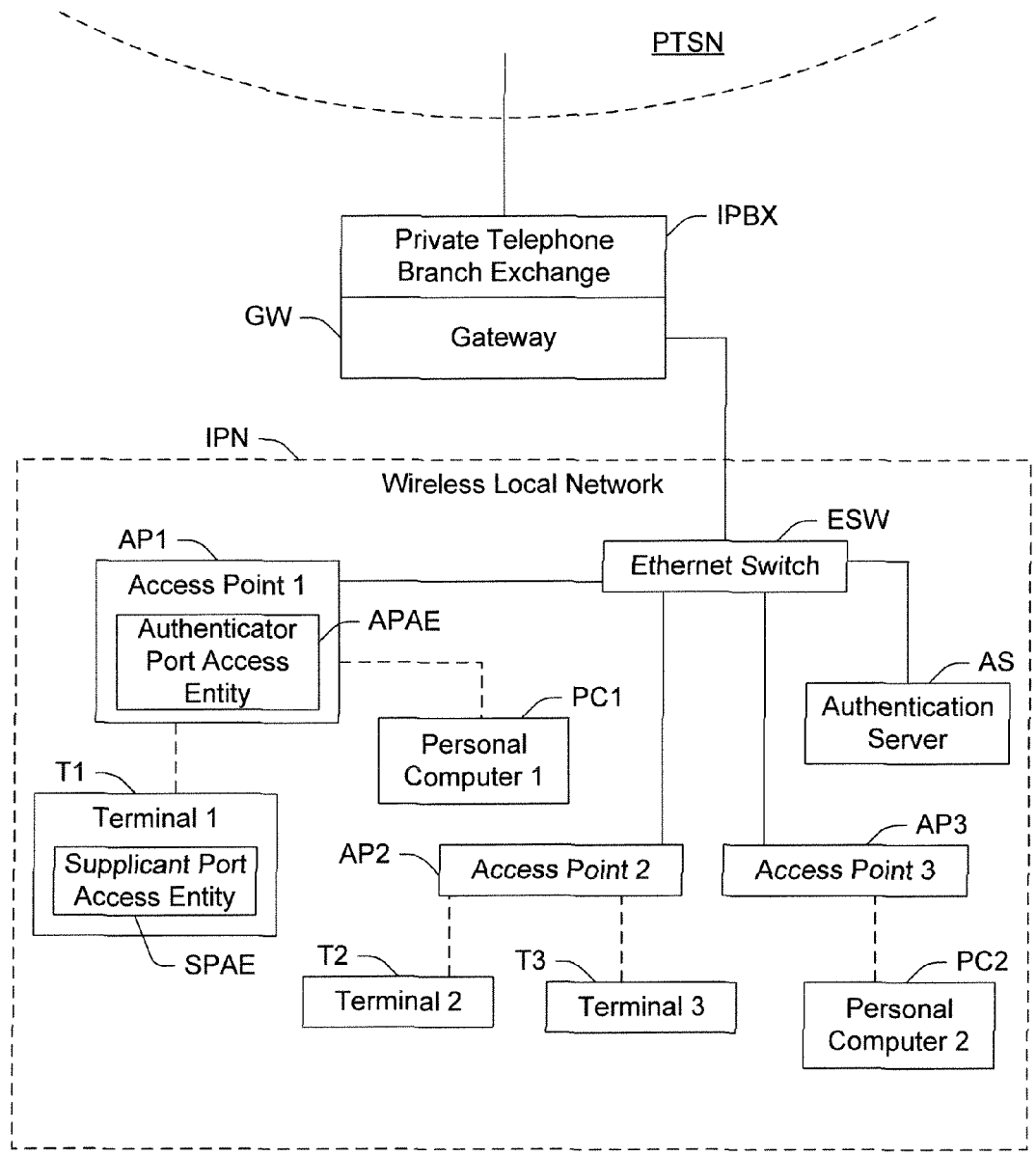
FIG. 1 represents the diagram of one example of an IEEE 802.11 type local network in which the method according to the invention can be implemented.

The IEEE 802.11 type local network IPN represented in FIG. 1 includes:

an Ethernet switch ESW;

an authentication server AS, of the RADIUS (Remote Authentication Dial In Service) type for example, connected to a port of the Ethernet switch ESW; and radio access points AP1, AP2, AP3 connected to respective ports of the Ethernet switch ESW.

The Ethernet switch ESW is connected to a private telephone branch exchange IPBX via a gateway GW. It enables the establishing of telephone calls in the local network IPN. This telephone branch exchange IPBX is also connected to a public telephone network PSTN.

Wireless telephone terminals T1, T2, T3, ... and portable computers PC1, PC2, ... are each connected to one of the radio access points AP1, AP2, AP3, for example by IEEE 802.11 radio links.

Authentication is effected using the Extensible Authentication Protocol (EAP) described in the document IEEE Std 802.1x-2001, for example, for communication between a protocol entity (Supplicant PAE) requesting authentication and an authentication server via a protocol entity (Authenticator PAE) that performs the authentication. The EAP can support diverse authentication methods. There will be considered here by way of example authentication by means of a single-use password, but the method according to the invention may be applied regardless of the authentication method used in the context of the IEEE 802.11 standard. The authentication of the telephone terminal T1 will be considered by way of example.

Each telephone terminal T1, T2, T3, ..., and each personal computer PC1, PC2, ... of the network includes software means enabling a port of an access point AP1, AP2, AP3, ... to execute the procedures for authentication of the terminal. Those software means execute a protocol entity called the Supplicant Port Access Entity (SPAE) in the terminology of the IEEE 802.1x standard. Each access point AP1, AP2, AP3, ... includes software means for executing a protocol entity associated with a port, that entity being intended to retransmit an authentication request to the authentication server AS. This entity is called the Authenticator Port Access Entity (APAE) in the terminology of the IEEE 802.1x standard. The IEEE 802.1x standard defines a format for encapsulating EAP messages to transmit them over a local network.

This encapsulation, known as EAPOL, is used for all calls between the terminal T1 and the access point AP1, for example. The latter reformats a message coming from the terminal T1 before retransmitting it to the authentication server AS, in accordance with the RADIUS protocol. The access point AP1 validates or inhibits the port susceptible to connect the terminal T1 to the local network, but does not interfere with the exchanges of messages between the terminal T1 and the authentication server AS, which enables the use of an authentication server AS remote from the access point AP1. The access point AP1 is initialized so that this port is inhibited. According to the IEEE 802.1x standard, the access point AP1 validates this port when, while monitoring the exchanges of messages between the terminal T1 and the authentication server AS, it registers the fact that the terminal T1 has been authenticated by the server AS.

FIG. 2 represents a timing diagram illustrating the known method according to the IEEE 802.11 and IEEE 802.1x standards for authenticating a terminal and then establishing a connection. It is used in the network represented in FIG. 1 using terminals T1, T2, T3, ..., access points AP1, AP2, AP3, ... and an authentication server AS which are all conventional. FIG. 2 represents the exchanges of messages in accordance with the IEEE 802.1x standard in the situation where the terminal T1 is authenticated successfully. The authentication method described is merely one example, the IEEE 802.1x standard supporting many other authentication methods. This exchange of messages takes place when the terminal is switched on or when the terminal enters the radio coverage area of another access point. The authentication is usually effected well before the request to establish a call.

Step 1: When it is switched on, the terminal T1 sends the access point AP1 a start-up message called the EAPOL-Start message in the terminology of the IEEE 802.1x standard.

Step 2: The access point AP1 responds to it with a message requesting the identity of the terminal, this message being called the EAP-Request/Identity message.

Step 3: The terminal T1 sends the access point AP1 a response message containing the identity of the terminal, this message being called the EAP-Response/Identity message.

Step 4: The access point AP1 reformats this response message and then forwards it to the authentication server AS. On the other hand, for the time being, it does not allow any other data stream coming from the terminal T1 to pass.

Step 5: The authentication server AS sends the access points AP1 a request message containing a single-use password, called the EAP-Request/OTP, OTP Challenge message.

Step 6: The access point AP1 reformats this request message and then forwards it to the terminal T1.

Step 7: The terminal T1 sends the access point AP1 a response message called the EAP-Response/OTP, OTPpw message.

Step 8: The access point AP1 reformats this response message and then forwards it to the authentication server AS.

Step 9: The authentication server AS verifies the response message sent by the terminal T1. If the verification is positive, it sends the access point AP1 an acceptance message called the EAP-Success message. This message may contain restrictions such as restricted access to a virtual network that is a subset of the network concerned or a set of firewall rules.

Step 10: The access point takes note of this acceptance message, reformats it and then forwards it to the terminal T1, and validates the port that will enable the terminal T1 to communicate with the whole of the local network, and in particular the telephone branch exchange IPBX. The terminal then awaits an event, for example the user requesting the establishing of a telephone call.

FIG. 3 represents a timing diagram illustrating the method according to the invention for establishing an emergency connection without authenticating a terminal. It is implemented in the network represented in FIG. 1 using terminals T1, T2, T3, ..., and an authentication server AS the respective software means whereof have been adapted to implement the method according to the invention. The access points AP1, AP2, AP3, ... are standard and necessitate no modification. In this example, the user of the terminal T1 has no right of access in the network IPN but switches on his terminal T1 to establish an emergency connection when he is in the radio coverage area of the network IPN.

Step 11: When it is switched on, the terminal T1 sends the access point AP1 a start-up message called the EAPOL-Start message.

Step 12: The access point AP1 responds to it with a message requesting its identity of the terminal called the EAP-Request/Identity message.

Step 13: The terminal T1 sends the access point AP1 a response message containing the identity of the terminal called the EAP-Response/Identity message.

Step 14: The access point AP1 reformats this response message and then forwards it to the authentication server AS. On the other hand, for the time being, it does not allow any other data stream coming from the terminal T1 to pass.

Step 15: The authentication server AS sends the access point AP1 a request message containing a single-use password called the EAP-Request/OTP, OTP Challenge message.

Step 16: The access point AP1 reformats this request message and then forwards it to the terminal T1.

Step 17: The terminal T1 sends the access point AP1 a response message called the EAP-Response/OTP, OTPpw message.

Step 18: The access point AP1 reformats this response message and then forwards it to the authentication server AS.

Step 19: The authentication server AS verifies the response message sent by the terminal T1. The verification is negative, and it therefore sends the access point AP1 a refusal message.

Step 20: The access point takes notes of this refusal message, and therefore does not validate the port that would enable the terminal T1 to communicate with the whole of the local network, and in particular the telephone branch exchange IPBX. The terminal then awaits an event, for example the user requesting the establishing of an emergency telephone call.

Step 21: The user enters an emergency telephone number (such as 112 in Europe or 911 in USA). The terminal T1 then sends the access point AP1 the standard start-up message called the EAPOL-Start message. This message is triggered by the fact that the user has entered, using the keypad of the terminal T1 or by pressing a dedicated key, the emergency telephone number and that number has been recognized as an emergency number by the terminal T1.

Step 22: The access point AP1 responds to it with the standard request message containing identity information called the EAP-Request/Identity message.

Step 23: The terminal T1 sends the access point AP1 a response message of a new type containing said identity information and an indication signifying that it is an emergency call. On the other hand, the emergency telephone number (such as 112 in Europe or 911 in USA) may not be transmitted.

Step 24: The access point AP1 reformats this response message and then forwards it to the authentication server AS.

Step 25: The authentication server AS recognizes in the message the indication signifying that it is an emergency call. The authentication server AS then sends the access point AP1 an acceptance message of a new type containing an indication signifying that this is a temporary authentication, valid only for the duration of an emergency call, i.e. up to a clearing down operation initialized by the rescue centre that has responded to the emergency call. The terminal T1 will then lose all its rights of access to the network.

Step 26: The access point AP1 reformats this acceptance message and then forwards it to the terminal T1, and validates the port that will enable the terminal T1 to communicate with the whole of the local network, until it receives a clearing down message sent by the rescue center that has responded to the emergency call.

Step 27: The terminal T1 sends the access point AP1 a message requesting establishing of a telephone connection, but this message is of a particular type that requests a connection to a rescue center without mentioning the emergency telephone number entered by the user (such as 112 in Europe or 911 in USA). This message will be routed by the local network to the branch exchange IPBX and it is the branch exchange IPBX that will enter an emergency telephone number. Thus it is not possible to use this method to circumvent authentication for fraudulent purposes.

In a variant embodiment, the authentication server may be integrated into a radio access point instead of being remote.

The scope of the invention is not limited to IEEE 802.11 type networks, and it may be applied in any network in which the method of establishing a connection in the network prohibits a priori the radio access points from establishing a connection between a terminal and the network before the authentication procedure is satisfied.

The invention claimed is:

1. A method enabling a user to establish an emergency connection in a local network, wherein the user is a non-subscriber to the local network, the method comprising, when the user has entered an emergency telephone number:
   receiving a start-up message from the terminal, at a radio access;
   sending a first message, which requests the identity of the terminal, from the radio access point to the terminal in response to the start-up message;
   receiving a second message which comprises the identity of the terminal and an indication signifying that the start-up message is for an emergency call, from the terminal, at the radio access point of the network;
   transmitting the second message containing said identity information and an indication signifying that the start-up message is for an emergency call, from the radio access point to an authentication server;
   receiving an acceptance message from the authentication server;
   recognizing the acceptance message in transit via the access point and in response validating a port of the access point whereby the terminal is enabled to establish an emergency connection over the local network; and
   transmitting the acceptance message to the terminal.

2. A radio access point of a local network for use in enabling a calling wireless terminal to establish an emergency connection in a local network, wherein the calling wireless terminal is not subscribed to the local network, comprising a processor configured for, when an emergency telephone number is indicated to be a called destination:
   receiving, at the radio access point, a start-up message originated by the calling wireless terminal;
   sending a message which requests the identity of the terminal from the radio access point toward the terminal in response to the start-up message;
   receiving at the radio access point a message which includes the identity of the calling wireless terminal and an indication signifying that the message including the identity of the calling wireless terminal is for an emergency call;
   transmitting, from the radio access point toward an authentication server, a message including the identity of the calling wireless terminal and an indication signifying that the message including the identity of the calling wireless terminal relates to an emergency call;
   receiving at the radio access point an acceptance message that was originated by the authentication server;

recognizing the acceptance message at the radio access point and in response validating a port of the radio access point to be available for use by the calling wireless terminal to establish an emergency connection over the local network; and transmitting indication of the acceptance message to the wireless terminal.

3. A system that permits a calling wireless terminal to establish an emergency connection in a local network comprising an authentication server, wherein the calling wireless terminal is not subscribed to the local network, the system comprising:

a wireless terminal that recognizes a user-entered number as an emergency number;

an access point configured to:

receive a startup message originated by the terminal;

send a first message, which requests the identity of the terminal, from the access point toward the terminal in response to the start-up message;

receive a second message, which comprises terminal identity information and an indication signifying that the startup message is for an emergency call, the second message having been originated by the wireless terminal;

transmit toward the authentication server the second message containing the identity information and an indication signifying indication signifying that the startup message is for an emergency call;

receive an acceptance message originated by the authentication server;

recognize, at the access point, the acceptance message;

in response to recognizing the acceptance message, validate a port of the access point to be available for use by the terminal to establish an emergency connection over the local network; and transmit the acceptance message toward the wireless terminal;

wherein the authentication server recognizes that the second message comprises an indication signifying that it is an emergency call.

4. A system that permits a calling wireless terminal to establish an emergency connection in a local network comprising an authentication server, wherein the calling wireless terminal is not subscribed to the local network, the system comprising:

an access point configured to:

receive a startup message originated by the terminal at a radio access point;

send a first message, which requests the identity of the terminal, from the access point toward the terminal in response to the start-up message;

receive a second message, which comprises terminal identity information and an indication signifying that the startup message is for an emergency call, the second message having been originated by the terminal;

transmit the second message containing the identity information and an indication signifying indication signifying that the startup message is for an emergency call from the access point toward the authentication server;

receive at the access point an acceptance message originated by the authentication server;

recognize, at the access point, the acceptance message;

in response to recognizing the acceptance message, validate a port of the access point to be available for use by the terminal to establish an emergency connection over the local network; and transmit the acceptance message toward the terminal;

wherein the authentication server recognizes that the second message comprises an indication signifying that it is an emergency call.

5. A radio access point of a local network for use in enabling a calling wireless terminal to establish an emergency connection in a local network when the calling wireless terminal is not subscribed to the local network and when an emergency telephone number is indicated to be a called destination, the radio access point comprising:

means for receiving a start-up message originated by the calling wireless terminal;

means, responsive to the start-up message, for sending toward the terminal a message which requests the identity of the terminal;

means for receiving a message which includes the identity of the calling wireless terminal and an indication signifying that the message including the identity of the calling wireless terminal is for an emergency call;

means for transmitting toward an authentication server a message including the identity of the calling wireless terminal and an indication signifying that the message including the identity of the calling wireless terminal relates to an emergency call;

means for receiving an acceptance message that was originated by the authentication server;

means for recognizing the acceptance message at the radio access point and in response validating a port of the radio access point to be available for use by the calling wireless terminal to establish an emergency connection over the local network; and means for transmitting an indication of the acceptance message to the wireless terminal.

* * * * *